United States Patent
Huang et al.

(10) Patent No.: US 11,423,555 B2
(45) Date of Patent: Aug. 23, 2022

(54) METHODS FOR GENERATING AERIAL PHOTOGRAPHING PATH FOR UNMANNED AERIAL VEHICLE, COMPUTER DEVICES, AND STORAGE MEDIUMS

(71) Applicant: SHENZHEN UNIVERSITY, Guangdong (CN)

(72) Inventors: Hui Huang, Guangdong (CN); Ke Xie, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 410 days.

(21) Appl. No.: 16/563,552

(22) Filed: Sep. 6, 2019

(65) Prior Publication Data
US 2020/0027225 A1 Jan. 23, 2020

Related U.S. Application Data

(63) Continuation of application No. PCT/CN2018/096399, filed on Jul. 20, 2018.

(51) Int. Cl.
*G06T 7/50* (2017.01)
*B64C 39/02* (2006.01)
(Continued)

(52) U.S. Cl.
CPC .............. *G06T 7/50* (2017.01); *B64C 39/024* (2013.01); *G01C 11/02* (2013.01); *G05D 1/0202* (2013.01);
(Continued)

(58) Field of Classification Search
CPC ............. G06T 7/50; G06T 2207/10032; G06T 2207/30244; G06T 7/73;
(Continued)

(56) References Cited

U.S. PATENT DOCUMENTS

| 2017/0314924 A1 | 11/2017 | Royster | |
| 2018/0045960 A1* | 2/2018 | Palacios | G02F 1/133 |
| 2020/0241575 A1* | 7/2020 | Meisenholder | G05D 1/0094 |

FOREIGN PATENT DOCUMENTS

| CN | 103842777 A | 6/2014 |
| CN | 106441308 A | 2/2017 |
| CN | 107305395 A | 10/2017 |
| CN | 107870623 A | 4/2018 |

(Continued)

OTHER PUBLICATIONS

Qingyan, Han, "Aerial Photography Path Planning and Camera Pose—Attitude Control for 3D Reconstruction," A Thesis in Aeronautics and Astronautics Manufacturing Engineering, Nanjing University of Aeronautics and Astronautics, Mar. 2017 (77 pages).

(Continued)

*Primary Examiner* — Jerome Grant, II
(74) *Attorney, Agent, or Firm* — Brandon V. Zuniga; James R. Gourley; Carstens & Cahoon, LLP

(57) ABSTRACT

The present application relates to methods, apparatuses, computer devices, and storage mediums for generating an aerial photographing path for a UAV. A method according to an embodiment includes acquiring an inputted aerial photographing landmark; obtaining a UAV aerial photographing safe space according to the aerial photographing landmark; constructing a viewing angle quality scalar field of the aerial photographing landmark; and generating an aerial photographing path set in the UAV aerial photographing safe space according to the viewing angle quality scalar field.

17 Claims, 9 Drawing Sheets

DIVIDING THE VIEWING ANGLE QUALITY SCALAR FIELD INTO A PLURALITY OF SPACES BASED ON A CYLINDRICAL COORDINATE SYSTEM — S410

ACQUIRING A CRITICAL VIEWING ANGLE OF EACH SPACE, AND PERFORMING CURVE FITTING IN THE UAV AERIAL PHOTOGRAPHING SAFE SPACE ON THE BASIS OF THE CRITICAL VIEWING ANGLE TO GENERATE AN AERIAL PHOTOGRAPHING PATH SET, THE CRITICAL VIEWING ANGLE IS A VIEWING ANGLE CORRESPONDING TO A MAXIMUM VALUE OF VIEWING ANGLE QUALITY IN THE SPACE — S420

(51) Int. Cl.
*G05D 1/02* (2020.01)
*G01C 11/02* (2006.01)

(52) U.S. Cl.
CPC .. *B64C 2201/123* (2013.01); *B64C 2201/127* (2013.01); *G06T 2207/10032* (2013.01)

(58) Field of Classification Search
CPC ........ G06T 2207/30241; B64C 39/024; B64C 2201/123; B64C 2201/127; B64C 2201/141; G01C 11/02; G05D 1/0202
USPC ....................................................... 382/103
See application file for complete search history.

(56) References Cited

FOREIGN PATENT DOCUMENTS

| CN | 107924188 A | | 4/2018 |
|---|---|---|---|
| CN | 107943072 A | | 4/2018 |
| CN | 108981706 | * | 12/2018 |
| CN | 109785387 | * | 5/2019 |
| CN | 112621711 | * | 4/2021 |

OTHER PUBLICATIONS

Yan, Fei, et al., "3D PRM based Real-time Path Planning for UAV in Complex Environment," 2012 IEEE International Conference on Robotics and Biomimetics, Dec. 11-14, 2012, Guangzhou, China (6 pages).

Office Action for Chinese Patent Application No. 201810800820.7 dated Mar. 3, 2021 (10 pages).

\* cited by examiner

METHODS FOR GENERATING AERIAL PHOTOGRAPHING PATH FOR UNMANNED AERIAL VEHICLE, COMPUTER DEVICES, AND STORAGE MEDIUMS

CROSS REFERENCE TO RELATED APPLICATIONS

This application is a continuation application of PCT Patent Application No. PCT/CN2018/096399, entitled "METHODS FOR GENERATING AERIAL PHOTOGRAPHING PATH FOR UNMANNED AERIAL VEHICLE, COMPUTER DEVICES, AND STORAGE MEDIUMS", filed on Jul. 20, 2018, the entire contents of which are incorporated herein by reference.

TECHNICAL FIELD

This application relates to the field of computer graphics, and more particularly to methods for generating an aerial photographing path for a UAV, computer devices, and storage mediums.

BACKGROUND

With the development and progress of UAV (Unmanned Aerial Vehicle) technology, UAVs have been widely used in various fields, and UAV-based operations have been extended from professional users to ordinary users. A UAV is amounted with a camera device, a wireless image transmission device, and a battery etc. For example, the wireless image transmission device and the battery are secured to the bottom of the UAV, and the transmit antenna is mounted vertically at the tail using a feed line. A UAV video source is connected to the wireless image transmission device to form a complete UAV wireless video image transmission system.

The user's manipulation focus needs to be switched between the UAV and the real-time wireless transmitted video, and in the UAV operation task it is often necessary to keep the UAV within the view of the pilot, in many application scenes, for example, in a large-scale outdoor scene, it is not possible to realize it.

The conventional generating of the UAV photographing path is mostly manually completed by a skilled person, and it is difficult to operate the UAV and the camera at the same time so that it is almost impossible for long range UAV photographing, i.e. the conventional UAV path has the problems that the workload is large and the operation is difficult.

SUMMARY

According to various embodiments of the present application, methods and apparatuses for generating an aerial photographing path for a UAV, computer devices, and storage mediums are provided which can reduce the workload and the work challenge are provided.

A method for generating an aerial photographing path for a UAV includes:
 acquiring an inputted aerial photographing landmark;
 obtaining a UAV aerial photographing safe space according to the aerial photographing landmark;
 constructing a viewing angle quality scalar field of the aerial photographing landmark; and
 generating an aerial photographing path set in the UAV aerial photographing safe space according to the viewing angle quality scalar field.

A computer device includes a memory and a processor, the memory stores computer-readable instructions that, when executed by the processor, cause the processor to perform the steps of the method for generating an aerial photographing path for a UAV according to any one of the embodiments of the present application.

One or more non-volatile storage medium storing computer-readable instructions that, when executed by one or more processors, cause the processor to perform the steps of the method for generating an aerial photographing path for a UAV according to any one of the embodiments of the present application.

The details of at least one embodiment of the present disclosure will be presented with reference to the following drawings and description. Other characteristic and advantages of the present disclosure will be more apparent from the specification, drawings and claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the technical solution and advantages of the present disclosure will be more apparent. It should be understood that the particular embodiments are described for the purpose of illustrating as opposed to restricting the present disclosure.

Figure 1:
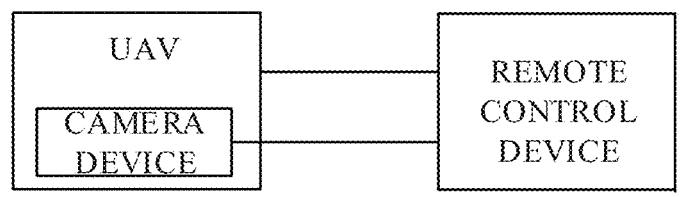
FIG. 1 is an application environment diagram of a method of generating an aerial photographing path for a UAV according to an embodiment.

The method provided in this application may be applied to the application environment as shown in FIG. 1. The UAV aerial photographing system includes a UAV, a remote control device, and a camera device. The camera device may be provided in the UAV, the UAV communicates with the remote control device via the network, and the remote control device communicates with the camera device via the network. The flying of the UAVs is controlled by the remote control device, and the imaging device is controlled to perform the photographing during the flying of the UAVs. The user may input the aerial photographing landmark through the remote control device, and the remote control device acquires an inputted aerial photographing landmark; obtains a UAV aerial photographing safe space according to the aerial photographing landmark; constructs a viewing angle quality scalar field of the aerial photographing landmark; and generates an aerial photographing path set in the UAV aerial photographing safe space according to the viewing angle quality scalar field. The remote control device transmits the generated aerial photographing path set to the UAV and the camera device, the UAV travels according to the aerial photographing path set, and the camera device performs the aerial photographing along the aerial photographing path set.

Figure 2:
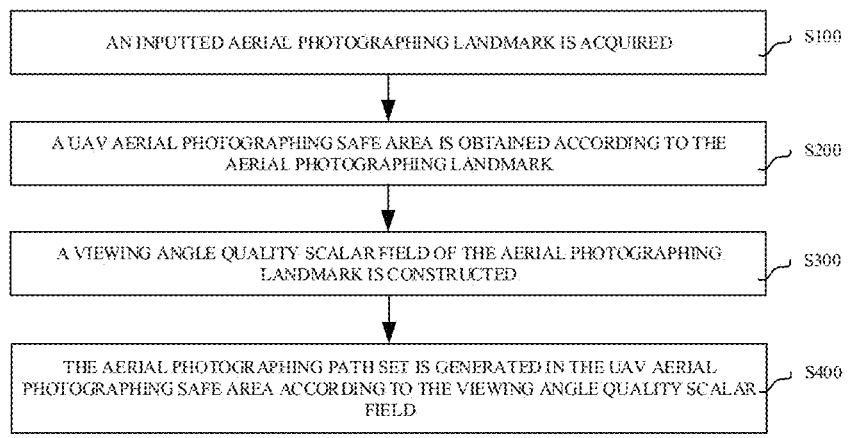
FIG. 2 is a flow chart of a method of generating an aerial photographing path for a UAV according to an embodiment.

In an embodiment, as shown in FIG. 2, a method for generating an aerial photographing path for a UAV is provided, which is applied to the remote control device of FIG. 1 as an example, including the following steps:

At step 100, an inputted aerial photographing landmark is acquired.

Aerial photographing may be referred to as aerial photographing or air photographing, which is to photograph from air. An aerial picture refers to an image or video obtained by the aerial photographing, and the aerial picture can clearly represent a geographical form. Therefore, in addition to being part of the photographic art, aerial photographing is also used for military, traffic facility construction, water conservancy, ecological research, urban planning, and other purposes. The aerial photographing landmark refers to the landmark in the aerial photographing scene. For example, when the aerial photographing scene is a campus, the landmark of the campus includes a library, a school history museum, etc. In this case, the aerial photographing landmark may particularly be a library, a school history museum, etc.

At step 200, a UAV aerial photographing safe space is obtained according to the aerial photographing landmark.

The UAV aerial photographing safe space refers to an space where the UAV can enter when the UAV is performing aerial photographing. In view of the extremely high requirements for safety for UAV flight, and in view of the error of the civil GPS (Global Positioning System), it is necessary to calculate the spaces where the UAV may and may not enter based on 2.5-dimensional information of the preset aerial photographing scene. The information of the preset 2.5-dimensional aerial photographing scene may include the landmark information in the scene, specifically the longitude and latitude coordinate information and the height information corresponding to the two-dimensional silhouettes of the landmark. From the information of 2.5-dimensional preset aerial photographing scene, the space in a certain distance from the landmark is divided into a prohibited space, and the remaining space is a safe space.

In an embodiment, the obtaining the UAV aerial photographing safe space according to the aerial photographing landmark may include acquiring an image corresponding to the aerial photographing landmark and two-dimensional silhouettes of the aerial photographing landmark; calculating a distance between each pixel in the image and the two-dimensional silhouettes; and acquiring a pixel corresponding to a preset safe distance in the distance, obtaining an equidistant line corresponding to the preset safe distance from the pixel, and using the equidistant line as the two-dimensional silhouettes of the aerial photographing prohibited space; and obtaining a UAV aerial photographing safe space according to two-dimensional silhouettes of the aerial photographing prohibited space.

At step 300, a viewing angle quality scalar field of the aerial photographing landmark is constructed.

The UAV aerial photographing viewing angle refers to an included angle formed from the center point of the camera lens to both ends of the diagonal line of the imaging plane of the UAV. For the same imaging area, the shorter the lens focal length, the larger the viewing angle. For the lens, the viewing angle mainly refers to the viewing angle range that can be realized by the lens, and the shorter the focal length of the lens, the larger the viewing angle, and the wider the photographing range; and the longer the lens focal length, the smaller the viewing angle, and the clearer the lens photographing object. The scalar field refers to a field that can be fully characterized by its magnitude only, the viewing angle quality scalar field is configured to construct a gridded model of the aerial photographing landmark, and the viewing angle quality is related to the rendering image of the viewing angle and the weight map.

First, the salience of different parts of the landmark is calculated based on the 2.5-dimensional information of the landmark, the rendering color intensity of the different parts is determined according to the difference in salience, and then the viewing angle quality scalar field of the entire space is calculated according to the weight map. In an embodiment, constructing the viewing angle quality scalar field of the aerial photographing landmark may include acquiring a rendering image of the aerial photographing landmark; constructing a weight map corresponding to an image pixel of the aerial photographing landmark; and obtaining a viewing angle quality scalar field of the aerial photographing landmark according to the rendering image and the weight map. In particular, the acquiring the rendering image of the aerial photographing landmark may include calculating a top surface salience and a side surface salience of the aerial photographing landmark respectively; and obtaining the rendering image of the aerial photographing landmark according to the top surface salience and the side surface salience.

At step 400, the aerial photographing path set is generated in the UAV aerial photographing safe space according to the viewing angle quality scalar field.

The aerial photographing path set includes a plurality of aerial photographing paths, the space corresponding to the landmark is divided into multiple stacks, each stack is in turn divided into multiple cells, and a key viewing angle of the space is selected in each cell. The aerial photographing path is calculated from each key viewing angle. In order to reduce the number of possible aerial photographing paths and to exclude underlength paths, a screening condition may be set, for example, regarding the aerial photographing path passing a predetermined number of cells and above as the candidate aerial photographing path. Then, according to the number of the stacks the candidate aerial photographing paths passing through, the candidate aerial photographing paths are classified, with each type of the candidate aerial photographing paths corresponding to the stack through which the path passes, and the path in each type of the candidate aerial photographing paths that has the highest viewing angle quality is selected as the path in the aerial photographing path set.

For example, the space around each landmark is divided into five stacks, four of which are radius circle spaces, one of which is a landmark upper space, and each stack is further divided into a number of cells. One sampling point is selected in each cell as a key viewing angle of the space. The selected pair of any two viewing angles are respectively regarded as the starting viewing angle and the ending viewing angle to calculate the corresponding aerial photographing path. In order to reduce the number of possible photographing paths and to exclude underlength paths, only the paths passing through four or more cells are selected as the candidate photographing paths. Finally, according to the number of stacks the candidate aerial photographing paths pass, all candidate aerial photographing paths are divided into five classes, respectively corresponding to the number of stacks the candidate aerial photographing paths pass, and one out of each of the classes with the highest viewing angle quality is selected as the local aerial photographing path, that is, each landmark has a maximum of five local candidate photographing paths.

In the described method for generating an aerial photographing path for a UAV, a user inputs an aerial photographing landmark, by acquiring an inputted aerial photographing landmark, obtaining a UAV aerial photographing safe space according to the aerial photographing landmark, constructing a viewing angle quality scalar field of the aerial photographing landmark, and generating an aerial photographing path set in the UAV aerial photographing safe space according to the viewing angle quality scalar field, whereby an aerial photographing path can be automatically generated, so that the workload and work challenge for the user is remarkably reduced.

Figure 3:
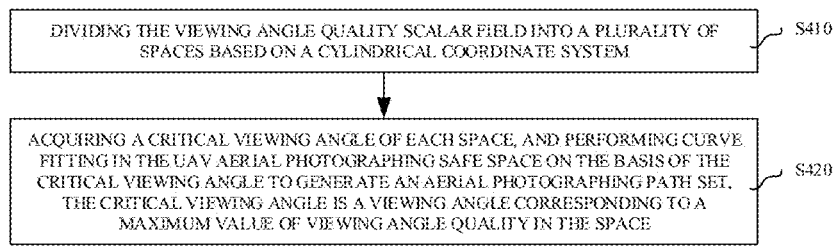
FIG. 3 is a flow chart showing a step of generating an aerial photographing path set in a UAV aerial photographing safe space according to a viewing angle quality scalar field according to an embodiment.

In an embodiment, as shown in FIG. 3, the generating an aerial photographing path set in the UAV aerial photographing safe space according to the viewing angle quality scalar field includes: step S410, dividing the viewing angle quality scalar field into a plurality of spaces based on a cylindrical coordinate system; and step S420, acquiring a key viewing angle of each space, and performing curve fitting in the UAV aerial photographing safe space on the basis of the key viewing angle to generate an aerial photographing path set, the key viewing angle is a viewing angle corresponding to a maximum value of viewing angle quality in the space. In the cylindrical coordinate system, the viewing angle space corresponding to the aerial photographing landmark is divided into a plurality of pie-shaped spaces, in which a suitable viewing angle is selected. A local cylindrical coordinate system is built around the landmark, the calculation is performed using the generalized cylindrical coordinate surrounding the landmark, and then divided into a plurality of viewing angle spaces according to the height. Different colors are used in the viewing angle space to represent different stacks, such as a total of five stacks. The viewing angle with the highest viewing angle quality is selected within each stack, and any two viewing angles are selected as the starting and ending key viewing angles, respectively. A key viewing angle is added between the starting and the ending, the addition of the key viewing angle can be done by a linear interpolation on the distance, pitch angle, and azimuth angle from the key viewing angle to the landmark, which is then fitted using a 5-order b-spline curve to obtain a smooth photographing path.

In an embodiment, the space includes a plurality of sub-spaces to obtain a key viewing angle of each space, including acquiring a viewing angle quality corresponding to each sub-space in the space, and regarding a viewing angle corresponding to a maximum viewing angle quality as a candidate viewing angle of the space; and removing a viewing angle in the candidate viewing angle whose corresponding distance is less than a preset value, and obtaining a key viewing angle of the space. The viewing angle with the highest viewing angle quality in each space is selected, in order to avoid that the distance between the two viewing angles being too close, the key viewing angle with the highest viewing angle quality is selected, and then all candidate viewing angles within the preset distance are excluded, this process is iterated until all key viewing angles have been selected.

Figure 4:
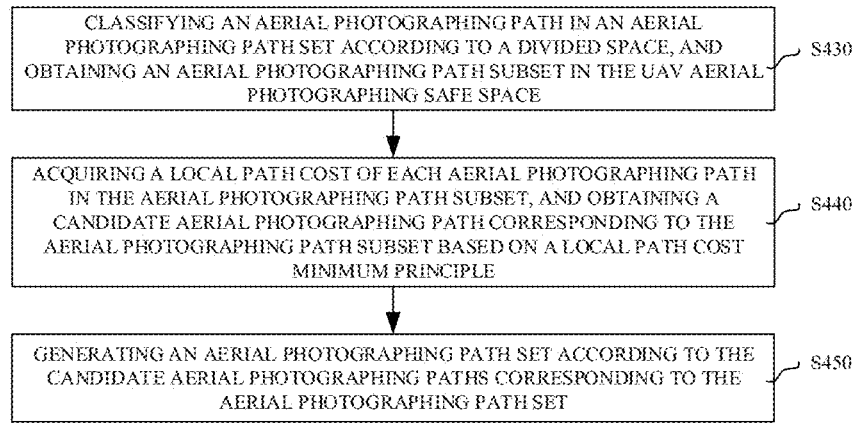
FIG. 4 is a flow chart of a step of generating an aerial photographing path set in a UAV aerial photographing safe space according to a viewing angle quality scalar field according to another embodiment.

In an embodiment, as shown in FIG. 4, the generating the aerial photographing path set in the UAV aerial photographing safe space according to the viewing angle quality scalar field includes: step S430, classifying aerial photographing paths in an aerial photographing path set according to a divided space, and obtaining an aerial photographing path subset in the UAV aerial photographing safe space; step S440, acquiring a local path cost of each aerial photographing path in the aerial photographing path subset, and obtaining a candidate aerial photographing path corresponding to the aerial photographing path subset based on a local path cost minimum principle; and step S450, generating an aerial photographing path set according to the candidate aerial photographing paths corresponding to the aerial photographing path set. According to the number of stacks the paths in the aerial photographing path set pass, all the paths in the aerial photographing path set are classified, for example, into five classes, respectively corresponding to 1 to 5 stacks, one of each with the lowest local path cost selected as the candidate; that is, each landmark has a maximum of five local candidate photographing paths. In an embodiment, the acquiring the local path cost of each aerial photographing path in the aerial photographing path subset includes acquiring an average viewing angle quality of the aerial photographing path, an angle between the aerial photographing path and the aerial photographing landmark dominant axis, and a change rate of the viewing angle of the aerial photographing path; and obtaining the local path cost corresponding to the aerial photographing path according to the average viewing angle quality of the aerial photographing path, the angle between the aerial photographing path and the aerial photographing landmark dominant axis, and the change rate of the viewing angle of the aerial photographing path.

Figure 5:
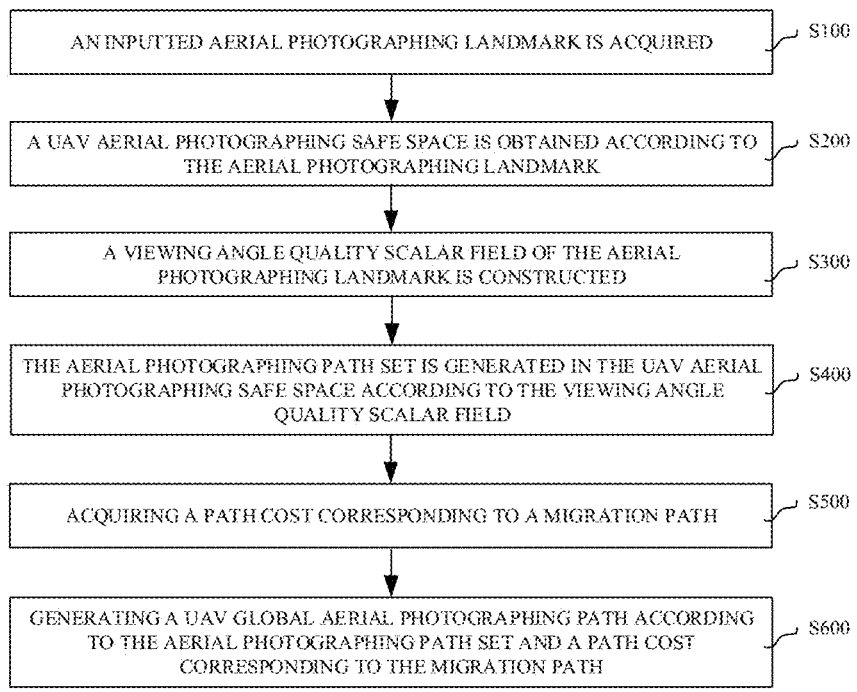
FIG. 5 is a flow chart of a method for generating an aerial photographing path for a UAV according to another embodiment.

In an embodiment, as shown in FIG. 5, when the inputted aerial photographing landmark is a plurality of aerial photographing landmarks, the generating the aerial photographing path set in the UAV aerial photographing safe space according to the viewing angle quality scalar field further includes: step S500, acquiring a path cost corresponding to a migration path; and step S600, generating a UAV global aerial photographing path according to the aerial photographing path set and a path cost corresponding to the migration path. In order to avoid collisions between the migration path connecting the two local paths in the aerial photographing path set and the landmark in the scene, the constructed migration path needs to avoid all the landmarks. The path cost of the migration path is related to the average viewing angle quality of the migration path, the change rate of the migration path viewing angle, and the steering angle of the migration path. Acquiring the path cost corresponding to the migration path includes: acquiring the migration path; acquiring an average viewing angle quality of the migration path, a change rate of the migration path viewing angle, and a steering angle of the migration path; and obtaining the path cost corresponding to the migration path according to the average viewing angle quality of the migration path, the change rate of the migration path viewing angle, and the steering angle of the migration path.

In an embodiment, the generating a UAV global photographing path according to the aerial photographing path set and the path cost corresponding to the migration path includes calculating a local path cost of each photographing path in the aerial photographing path set; and constructing and solving a generalized travel salesman problem according to the path cost corresponding to the migration path and the local path cost, and obtaining a UAV global aerial photographing path. When a plurality of landmarks are to be accessed, an aerial photographing path set with the lowest local path cost is calculated and constructed for each landmark. The objective is to determine the order of accessing the landmarks and to select a local photographing path for each landmark so that the overall cost of the global photographing path is minimized. The problem described is a difficult combinatorial optimization problem that can be solved by constructing it as a Set Traveling Salesman Problem (STSP). And different from in the TSP problem to find a Hamilton loop (i.e., a loop that traverses all of the vertices in the graph and with starting point coincides the ending point) which is the least expensive on the weight map, in the STSP problem, the vertex set V becomes a union of m point groups, and the objective is to find a Hamilton loop that can traverse the m point groups at the lowest cost.

In an embodiment, a method for generating an aerial photographing path for a UAV is described, for example, in an outdoor multi-landmark large scene. The input is 2.5-dimensional information, mainly including the landmark information in the scene (longitude and latitude coordinate information+height information of the two-dimensional silhouettes) and the landmark of interest specified by the user. A safe space and a prohibited space of a UAV flight are calculated on the basis of 2.5-dimensional information, and a set of local aerial photographing paths for a single landmark is first calculated in the safe space. Then, a path is selected from each local path set using a globally optimized algorithm to connect the aerial photographing paths that form the entire large scene. Finally, the aerial photographing task is completed along the automatically generated aerial photographing path in conjunction with the UAV flight control SDK (Software Development Kit).

Next, the main steps are described in detail, including the calculation of the safe space and the prohibited space, the construction of the viewing angle quality scalar field, the generation of the aerial photographing path for a single landmark, as well as the generation of the global path. In view of the extremely high requirements for safety for UAVs, and in view of the civil GPS error, it is necessary to calculate the spaces where UAV may and may not enter based on 2.5-dimensional information. Starting from the 2.5-dimensional information, the space in a certain distance (e.g., d meters) from the landmark is divided into a prohibited space, and the remaining space is a safe space.

Figure 6:
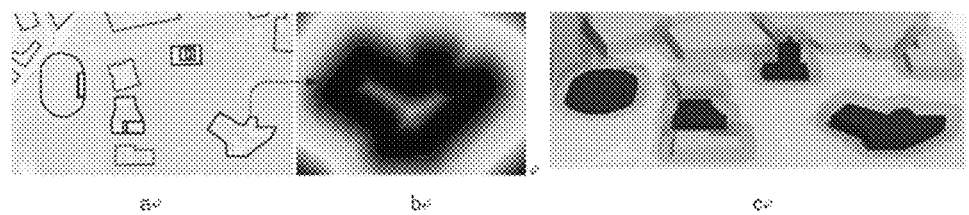
FIG. 6 is a schematic diagram of calculation of a safe space and a prohibited space according to an embodiment.

First, the distance field to the two-dimensional silhouettes is calculated from the two-dimensional silhouettes of a certain landmark, the method of calculating the distance may be the Opencv's distance transform method, and then the equidistant line of the safe distance d is extracted. The equidistant line is regarded as the two-dimensional silhouettes of the prohibited space, and the height of the prohibited space $H_m$ plus the safe distance d are regarded as the height of the prohibited space, that is, the height of the prohibited space is $H_m$+d. FIG. 6 is schematic diagram of calculation of a safe space and a prohibited space, a is a landmark and two-dimensional silhouettes, b is an equidistant line between a distance field and a distance d, and c is an example of a three-dimensional prohibited space.

The construction of the viewing angle quality scalar field includes two sub-portions, first calculating the salience of the different parts of the landmark according to the 2.5-dimensional information of the landmark, and determining the rendering color intensity of the different parts according to the salience difference, then, the viewing angle quality scalar field of the entire space is calculated from the weight map.

In the landmark surface salience calculation, the landmark surface is divided into a top surface and a side surface, for which different forms of salience calculation are used, with respect to the top surface, portions close to the top surface edge and to the central dominant axis are highlighted, so that it has a higher weight in the viewing angle quality calculation; for the side surface, portions close to the upper and lower edges and complex two-dimensional silhouettes are highlighted so that they have a higher weight in the viewing angle quality calculation.

Figure 7:
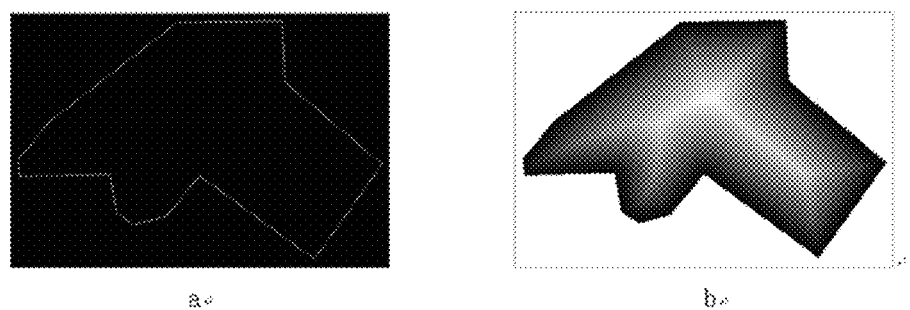
FIG. 7 is a schematic diagram of a distance field according to an embodiment.

For the top surface salience calculation, first, the distance field is calculated based on the two-dimensional silhouettes of the landmark, FIG. 7 is an illustrative diagram of the distance field, the figure a is a schematic diagram of the two-dimensional silhouettes of the landmark, and figure b is a schematic diagram of the distance field based on the two-dimensional silhouettes. The distance is normalized to [0, 1], and then mapped to [0.5, 1] using Equation 1, which corresponds to rgb (0.5, 0, 0) to rgb (1, 0, 0). Equation 1 is as follows: when distance is greater than 0.5, $$Color\_value = z/2 + 0.5,$$

$$z = \sin(z * 3.14153265)/2 + 0.5,$$

$$z = (distance - 0.5) * 2 - 0.5,$$

When distance is less than or equal to 0.5:

$$Color\_value = \exp(-(pow(abs(z), 2)) * 10) * 0.5 + 0.5,$$

$$z = 1 - abs(distance - 0.5) * 2;$$

distance is a normalized distance value and Color_value is an r value in a calculated pixel value rgb. A mapping function is constructed with a center z=0.5, where the function value is minimum 0.5 when z=0.5, and the corresponding pixel rgb value (0.5, 0, 0); the function maximum value is 1, and the corresponding pixel rgb value is (1, 0, 0).

For side surface salience calculation: the side surface salience calculation is based on two factors, 1) the distance to the boundary, and 2) the complexity of the two-dimensional silhouettes. For the distance to the boundary: the distance field from the point on the side to the upper and lower boundary is first calculated, the distance is normalized to [0, 1] and then mapped it to [0.5, 1] using Equation 2, and the corresponding rgb values are rendered from (0.5, 0, 0) to (1, 0, 0). For the complexity of the two-dimensional silhouettes: the complexity of the two-dimensional silhouettes is calculated, normalized to [0, 1], and then mapped to [0.5, 1] using Equation 3, and the corresponding rgb value are rendered from (0.5, 0, 0) to (1, 0, 0).

$$\text{Color\_value\_}d = \exp(-(\text{pow}(\text{abs}(z),2))*10)*0.5+0.5$$

$$z=1-\text{abs}(\text{distance}-0.5)*2 \quad \text{Equation 2:}$$

Distance is a normalized distance value and Color_value_d is an r value of a calculated pixel value rgb. A mapping function is constructed with a center z=0.5, the function value is minimum 0.5 when z=0.5, and the corresponding pixel rgb value (0.5, 0, 0); the function maximum value is 1, and the corresponding pixel rgb value is (1, 0, 0).

$$\text{Color\_Value\_}c = e^{-10*(error)^2} * 0.5+0.5, \quad \text{Equation 3:}$$

The minimum function value is 0 (corresponding to the smooth portion on the boundary), and the corresponding pixel rgb value (0.5, 0, 0); the function maximum value 1 (corresponding to the sharpest portion on the boundary), the corresponding pixel rgb value is (1, 0, 0). The final pixel value is the larger value in Color_value_c and Color_value_d.

According to the rule of thirds of photographic aesthetics (the scene is divided with two vertical lines and two horizontal lines, just like the Chinese character "井", the subject is placed on the dividing lines or points, alternatively, the image is distributed in three parts so that the subject is emphasized and a proper sense of space is maintained), and a weight map of the image pixels is constructed, the central white area is 1 and the boundary area is −1; for a pixel that is bounded between the center white area and the boundary, its weight $\omega = (1*d_{-1}+(-1*d_1))/(d_1+d_{-1})$ is calculated by its distance $d_1$ to the nearest pixel with a weight of 1 and the distance $d_{-1}$ to the nearest pixel with a weight of −1. The entire space is gridded, and the viewing angle quality at the center point of each grid toward the center of the landmark is calculated by Equation 4, so that the viewing angle quality scalar field of the entire space is obtained.

$$Q_m(v) = I_m(v) \cdot I^\omega, \quad \text{Equation 4:}$$

Figure 8:
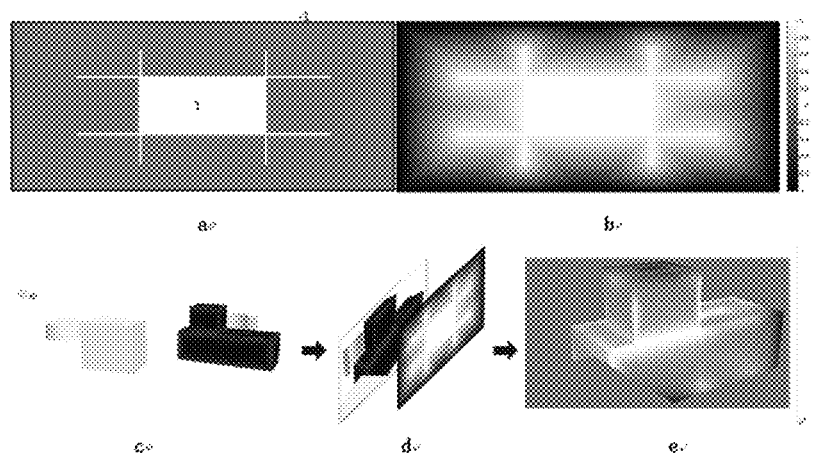
FIG. 8 is a schematic diagram of calculation of viewing angle quality according to an embodiment.

$I_m(v)$ is a rendering image of the viewing angle v, and $I^\omega$ is a weight map. FIG. 8 is schematic diagram of calculation of viewing angle quality, figure a is a diagram of a rule of thirds, figure b is a weight map, figure c is an example of a camera and a scene, figure d is a rendering result, and figure e is a mapping the rendering result to a weight map.

Figure 9:
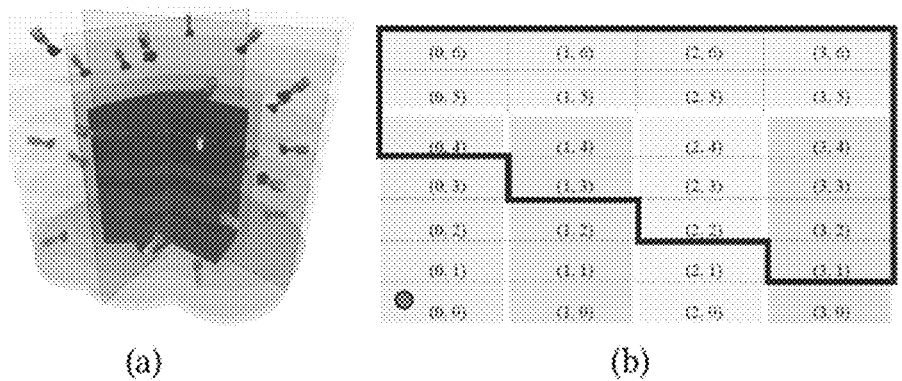
FIG. 9 is a schematic diagram of a division of a landmark local space and a two-dimensional representation of a viewing angle space according to an embodiment.

For the generation of the aerial photographing path of a single landmark, the space around each landmark is first divided into five stacks, four of which are radius circle spaces, one of which is a landmark upper space, and each stack is further divided into a number of cells. One sampling point is selected in each cell as a key viewing angle of the space. The selected pairs of any two viewing angles are respectively regarded as the starting viewing angle and the ending viewing angle to calculate the corresponding local aerial photographing path. In order to reduce the number of possible photographing paths and to exclude t underlength paths, only the paths passing through four or more cells is selected as the candidate set. Finally, according to the number of stacks the candidate aerial photographing paths pass, all candidate aerial photographing paths are divided into five classes (respectively corresponding to the number of stacks the candidate aerial photographing paths pass) and one out of each of the classes with the highest viewing angle quality is selected as the local aerial photographing path, that is, each landmark has a maximum of five local candidate photographing paths. FIG. 9a is a schematic diagram of the division of local spaces of the landmark, the viewing angle space is divided into a plurality of pie-shaped elements using cylindrical coordinates, and a suitable viewing angle is selected from each space. FIG. 9b is a two-dimensional view of a viewing angle space, and different colors indicate different stacks, which are five in total. The local path starts from the lower left corner and passes through at least four cells, so that the end-point viewing angle should fall within the frame.

For the division of the five stacks: a local cylindrical coordinate system centered around the landmark is first established and the generalized cylindrical coordinate surrounding the landmark is used for calculation. Then, a plurality of layers are divided according to the height, assuming that the landmark height is $h_m$, the height constraint minimum is set to $h_{min}$, the height of each layer is $h_i = \max\{h_{min}, 0.2(h_m+h_{min})\}$, the height maximum is $(h_m + 2*h_i)$, and according to these definitions, the landmark and the surrounding spaces are divided into a maximum of 7*4=28 spaces, as shown in FIG. 10a.

For key viewing angle selection: in each space, the viewing angle with the highest score in Equation 4 is selected, and first select the key viewing angle with the highest score so as to avoid the distance between the two viewing being too close; all candidate viewing angles within the distance $h_{min}$ are then excluded, and the process is iterated until all key viewing angles have been selected.

Figure 10:
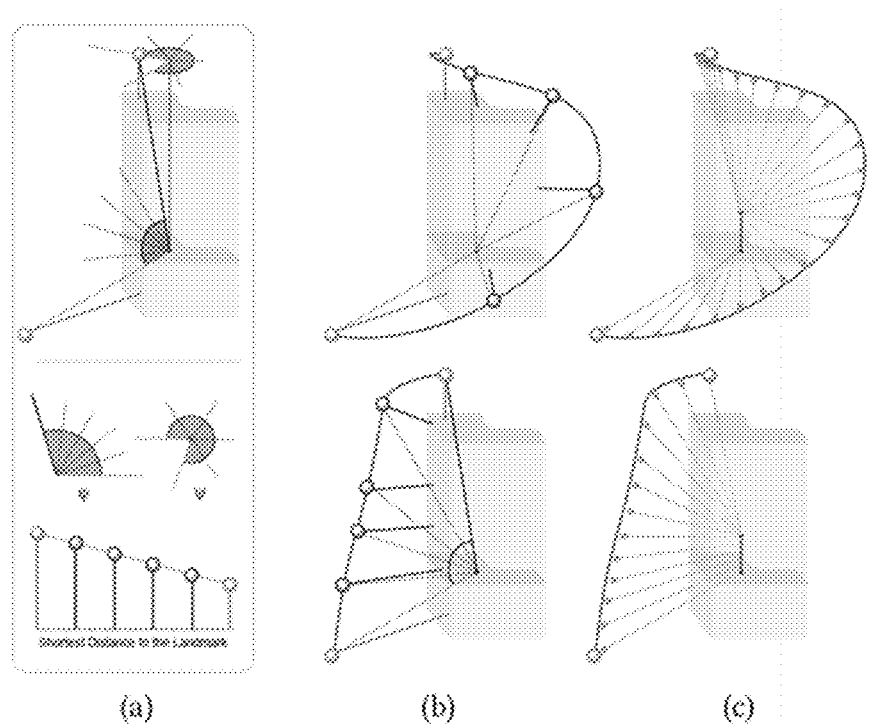
FIG. 10 is a schematic diagram of generating a local path according to an embodiment.

For path generation: based on the key viewing angles generated in the previous step, two of which are selected as the starting and ending key viewing angles respectively, four key viewing angles are first added between the starting and ending, the addition of the key viewing angles can be done by a linear interpolation on the distance, pitch angle, and azimuth angle ($\phi$, $\psi$) from the key viewing angle to the landmark, the total six key viewing angles are then fitted using a 5-order b-spline curve to obtain a smooth photographing path, see FIG. 10.

FIG. 10 is a schematic diagram of generating a local path, (a) a 5-order b-spline curve is constructed by calculating four intermediate viewing angles from a given starting viewing angle and an ending viewing angle. The intermediate four viewing angles are obtained by interpolating linearly between the inclination angle $\phi$, the two-dimensional orientation angle $\psi$ (clockwise or counterclockwise), and the distance from the viewing angle to the landmark, so that at least two interpolation paths are obtained between the two angles.

The calculation of the cost of the local path takes into account three factors: 1) an average viewing angle quality of all points on the path, 2) an angle between the path direction and the landmark geometric dominant axis, and 3) an average change rate of the viewing angle on the path. All the paths are divided into five classes according to the number of stacks the paths pass (respectively corresponding to passing 1 to 5 stacks), one out of each class with the lowest cost function value obtained from Equation 5 is selected as the candidate; that is, each landmark has a maximum of five local candidate photographing paths.

$$E_{local}(T_{s,e}) = E_{quality} + E_{axis} + E_{rot}, \quad \text{Equation 5}$$

$$E_{quality} = 1 - \frac{1}{|V_{s,e}|} \sum_{v \in V_{s,e}} Q_m(v),$$

$$E_{axis} = 1 - \frac{|(p_s - p_e) \cdot D_m|}{\max(\|p_s - p_e\|^2, \|D_m\|^2)},$$

$$E_{rot} = \frac{1}{\gamma(T_{s,e})}(1 - (q_s \cdot q_e)),$$

$T_{s,e}$ is a local photographing path with a starting point $p_s$ and an ending point $p_e$; $E_{quality}$ is the average viewing angle quality along the path $T_{s,e}$, $V_{s,e}$ is all points on the path, the definition of $Q_m(v)$ is the same as that of the Equation 4; $E_{axis}$ is the matching degree between the path and the landmark dominant axis, $p_s$, $p_e$ are the starting point and the ending point of the path, respectively, $D_m$ is the landmark dominant axis direction; $E_{rot}$ is the change rate of the camera direction along the path $T_{s,e}$, $q_s$, $q_e$ are the viewing angle direction of the starting point and the ending point of the path, and $\gamma(T_{s,e})$ is the path length.

Figure 11:
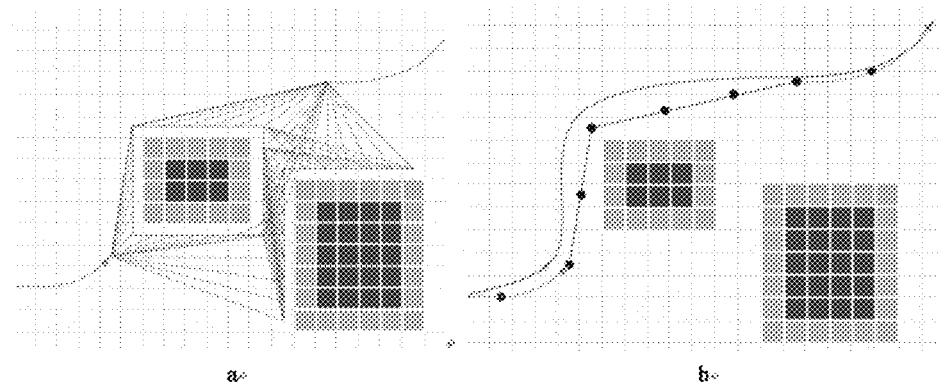
FIG. 11 is a schematic diagram of generating a migration path according to an embodiment.

The generation of the global path includes generation of the migration path, calculation of the migration path cost function, and global path resolution based on the STSP. To avoid collisions between the migration path connecting the two local paths and the landmark in the scene, it is necessary to construct a migration path to avoid all the landmarks. A visibility graph including the starting point, the ending point, and the sampling points on the periphery of the prohibited space of the landmark is constructed, as shown in FIG. 11a, the two small cells of the graph that are connected by a straight line indicates that the two cells reached by a straight line and will not collide with the landmarks existing in the scene, and then the migration path is obtained using a prior method.

Figure 12:
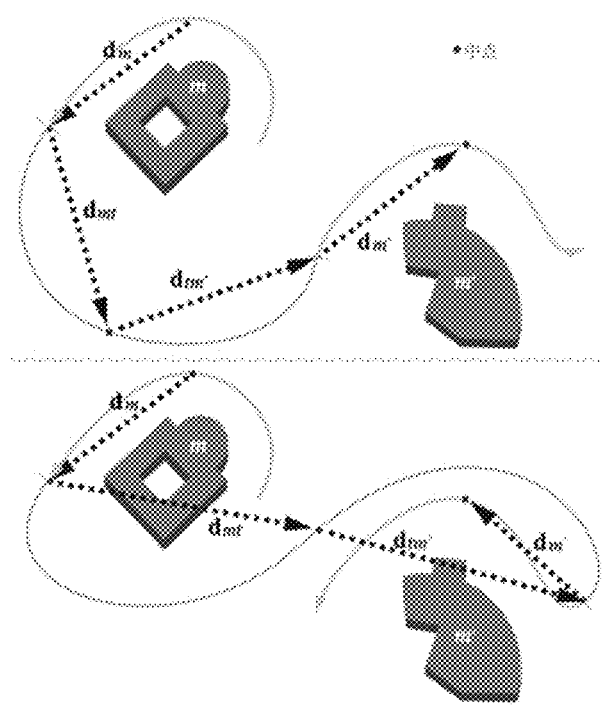
FIG. 12 is a schematic diagram of a steering count of a migration path according to an embodiment.

Similar to the local path, a cost function of the migration path needs to be constructed to calculate the cost of the migration path. Unlike locally, the cost of the migration path takes into account 1) an average viewing angle quality (involving two landmarks) of all points on the path, 2) an average change rate of the viewing angle on the path, 3) a degree of migration steering. FIG. 12 is a schematic diagram of a steering count of a migration path, which mainly considers the angular variation between $d_m$, $d_{mt}$, $d_{tm'}$, $d_{m'}$. The migration path cost function can be expressed as Equation 6:

$$E_{trans}(T_{ij'}^{mm'}) = E_{quality} + E_{rot} + E_{turn},$$

$$E_{quality} = 1 - \frac{1}{|V_{m,m'}|} \sum_{v \in V_{m,m'}} Q_{mm'}(v),$$

$$E_{turn} = \frac{1}{4}(2 - (d_m \cdot d_{mt}) - (d_{tm'} \cdot d_{m'})),$$

$T_{ij'}^{mm'}$ is the migration path connecting the local paths $T_j^m$ and $T_{j'}^{m'}$, the definition of $E_{rot}$ is the same as that in Equation 5; the double landmark viewing angle quality is $Q_{mm'}(v) = w_m Q_m(v) + w_{m'} Q_{m'}(v)$, the weights of the two landmarks are $$w_m = e^{\frac{d^2(v,m)}{\rho d^2(v,m')}} \text{ and } w_{m'} = e^{\frac{d^2(v,m')}{\rho d^2(v,m)}},$$

d is the Euclidean distance, $\rho=0.05$, $\rho'=0.05$, $Q_m(v)$ and $Q_{m'}(v)$ are respectively the viewing angle qualities of the two landmarks obtained by Equation 4. $E_{quality}$ is the average viewing angle quality along the path, $V_{m,m'}$ is all points on the path. $E_{turn}$ is the direction matching degree of the transition path and two join paths, the definitions of $d_m$, $d_{mt}$, $d_{tm'}$, $d_{m'}$ can refer to FIG. 12.

For a global path solution based on STSP: for each landmark, a local that computes and builds a candidate local path set with the highest score (lowest cost) is calculated and constructed. The objective is to determine the order of accessing the landmarks and to select a local flight path for each landmark so that the overall cost of the global flight path is minimized. The problem described is a difficult combinatorial optimization problem that is resolved by constructing it as a Generalized Travel Salesman Problem.

Figure 13:
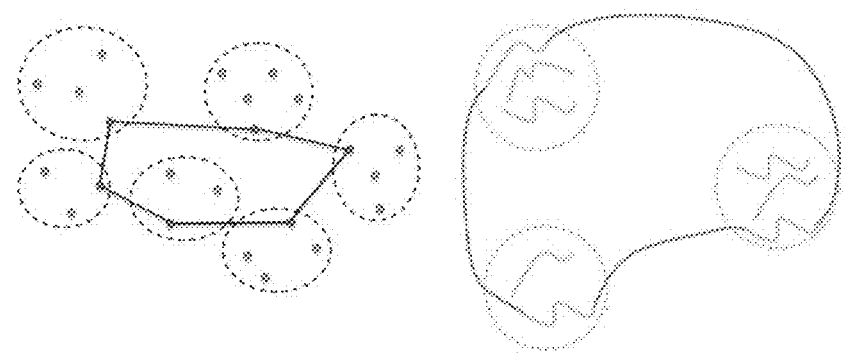
FIG. 13 is a schematic diagram of a STSP problem and a schematic diagram of a static scene aerial photographing path including three landmarks according to an embodiment.

And different from in the TSP problem to find a Hamilton loop (i.e., a loop that traverses all of the vertices in the graph and with starting point coincides the ending point) which is the least expensive on the weight map G, in the STSP problem, the vertex set V becomes a union of m point groups, $V = V1 \cup V2 \cup \ldots \cup Vm$, the objective is to find a Hamilton loop that can traverse the least cost of the m point groups at the lowest cost. A candidate term of an aerial photographing path of a single landmark is geometrically abstracted as a point group in the STSP, a cost calculation method of the aerial photographing path within a safe space is defined, and the speed of the aerial photographing path, the change rate of the camera parameters, the smoothness of the path, etc are added to the path cost calculation function to obtain the aerial photographing path of the entire static scene with the lowest cost. In FIG. 13, the left diagram is a schematic diagram of a STSP problem, and the right diagram is a schematic diagram of a static scene aerial photographing path including three landmarks.

Figure 14:
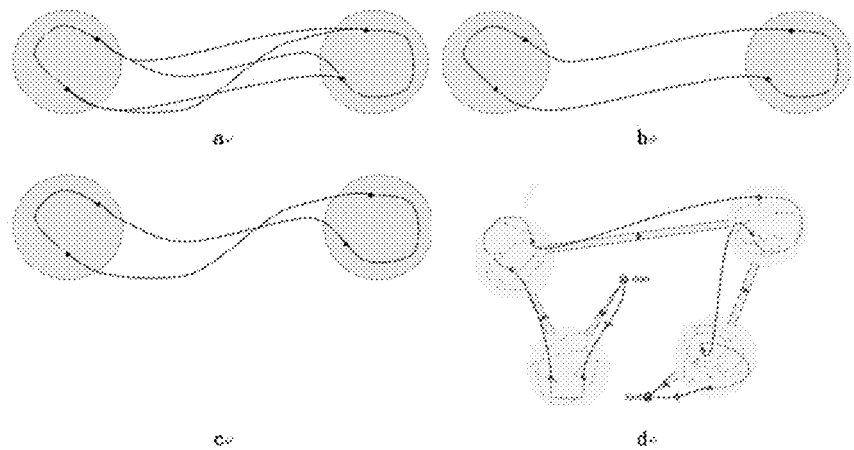
FIG. 14 is a schematic diagram of a STSP corresponding to the present application according to an embodiment.

Each local path corresponds to one node in the STSP graph, and the overall path cost may be represented by adding the local path cost and the migration path cost. For example, assuming that the local paths A, B, C, and the access order is A→B→C, there are four connection modes between the two local flight paths, that is, there are four possible migration paths between them, as shown in FIG. 14a. Four migration paths form two possible loops, as shown in FIGS. 14b and c, in the graph structure shown in FIG. d, each landmark corresponding candidate local path set is defined as each node of the graph, each node is a cluster (set) formed by a plurality of candidate paths.

The described method for generating an aerial photographing path for a UAV is highly automated, so that the user does not need to specify a key viewing angle, and does not need to design the order of the entire aerial photographing path, and the global optimum aerial photographing path can automatically be calculated. The interaction of the described method for generating an aerial photographing path for a UAV is simple, so that a user does not need to perform a complicated operation such as editing the three-dimensional path in a complex three-dimensional space, and generally does not need to set parameters, but only needs to select landmarks of interest. The described method for generating an aerial photographing path for a UAV is practical and solves problems in practical application and can greatly improve the efficiency of the aerial photographing operation.

The described method for generating an aerial photographing path for a UAV is tested in a number of large-scale outdoor scenes, in which the generation of the aerial photographing path is completed, and the actual aerial photographing task is completed. Testing was performed in five large-scale outdoor scenes, and statistics on the operational efficiency are shown in Table 1.

TABLE 1

Table of Statistics of Actual Scene Calculation Time

| Scene | Landmarks Number | Field Calculation Time | Local Path Generation Time | Global Optimization Time | Global Path Length |
| --- | --- | --- | --- | --- | --- |
| Gymnasium | 3 | 5 minutes | 15 seconds | 10 seconds | 2475 meters |
| Campus | 4 | 7 minutes | 37 seconds | 15 seconds | 2179 meters |
| City Bay | 3 | 5 minutes | 18 seconds | 15 seconds | 3190 meters |
| Sunlight Beach | 4 | 10 minutes | 41 seconds | 38 seconds | 3806 meters |
| Sea World | 5 | 8 minutes | 50 seconds | 31 seconds | 2998 meters |

A portable UAV, DJI Mavic Pro, is used to photograph aerial video on the spot. The flight motion of the UAV includes moving forward, backward, left or right along the horizontal axis, increasing and lowering its height, and changing its direction clockwise or counterclockwise. A camera equipped with 4K/30 fps 12 million pixels is stabilized by a 3-axis mechanical balance ring. The camera tilt may be controlled by a program between 0 and 90 degrees.

In the experiment, the DJI WaypointMission SDK was used to develop an APP to automatically control the UAV and camera, allowing the UAV to automatically fly and photograph along the path generated by the system. Using this SDK, a sequence of up to 99 path points (physical locations of a UAV flight) may be specified. The desired UAV body orientation and camera inclination angle may also be specified for each path point. The UAV then moves from one path point to another at a constant preset speed, the height, the UAV body orientation, and the camera inclination are adjusted. Thus, given the camera flight path, up to 99 sampling points can be obtained by sampling on the path, and path points including UAV body orientation, camera inclination angle, and three-dimensional position information of the UAV can be obtained. The actual flight of the UAV passes through each sampling point, which means that the path of the UAV flight is close to the resulting smooth trajectory.

Figure 15:
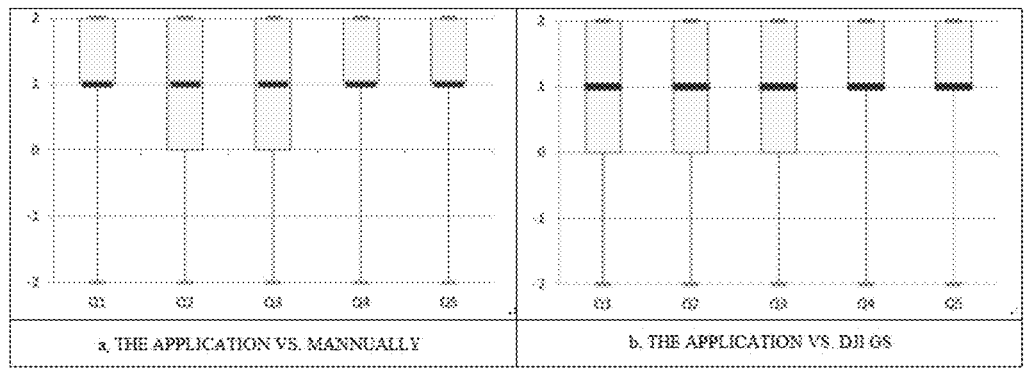
FIG. 15 is a schematic diagram of a user survey statistics according to an embodiment.

In order to prove the practicality of the present application, a comparison is made between the aerial video of the present application and the aerial video obtained by manually controlling the aerial video by the flight controller, and a user study is performed to evaluate the result. A user survey was conducted in four scenes (Sea World, Campus, City Bay, and Sunny Beach) with reference to Table 1 for the number of landmarks and path lengths. In the experiment, the user is invited to compare the photographic effect of the landmark with the migration effect between the landmarks. Supposing that 1) more pleasant aerial videos are provided, 2) better preview of the landmarks, 3) more reasonable paths, 4) more reasonable migration between landmarks, 5) a smoother entire photographing path. During the actual investigation, the left and right portions of the screen present both the automatic aerial video and the manual aerial video, yet the left and right positioning are random, and the user does not know in advance which one is the result of the present application. The problem presented to the user is: 1) the left video is more pleasant, 2) the left video provides a better preview of the landmarks, 3) the left video has a more reasonable photographing path, 4) the left video provides a more reasonable migration path between the landmarks, 5) the left video has a smoother photographing path. For each question, the user may provide one out of the five options as an answer, 1) fully agree, 2) substantially agreed, 3) not sure, 4) substantially disagree, and 5) fully disagree. The results of this application are also compared with those of the DJI GS Pro application. The number of users participating in the survey is 80, and the results of the survey are shown in FIG. 15, the vertical axis score −2 represents total disagree and 2 represents fully agreement. Q1 to Q5 of the horizontal axis corresponds to each of the five assumptions, the short thick line represents the median of the score, the bottom edge of the small box represents that 25% of the answer is lower than the score, and the top edge represents that 75% of the score is lower than the score, that is, 50% of the score is within the box.

Figure 16:
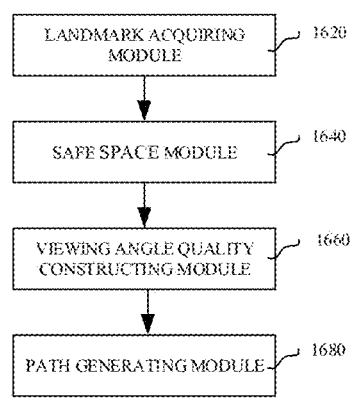
FIG. 16 is a block diagram of an apparatus for generating an aerial photographing path for a UAV according to an embodiment.

In an embodiment, as shown in FIG. 16, an apparatus for generating Aerial photographing path for a UAV is provided, which includes a landmark acquiring module 1620, a safe space module 1640, a viewing angle quality constructing module 1660, and a path generating module 1680. The landmark acquiring module is configured to acquire an inputted aerial photographing landmark; the safe space module is configured to obtain a UAV aerial photographing safe space according to the aerial photographing landmark; the viewing angle quality constructing module is configured to construct a viewing angle quality scalar field of the aerial photographing landmark; and the path generating module is configured to generate an aerial photographing path set in the UAV aerial photographing safe space according to the viewing angle quality scalar field.

In an embodiment, the path generating module includes a scalar field dividing unit configured to divide the viewing angle quality scalar field into a plurality of spaces based on a cylindrical coordinate system; a key viewing angle unit configured to acquire a key viewing angle of each space, and perform curve fitting on each key viewing angle in the UAV aerial photographing safe space to generate an aerial photographing path set, the key viewing angle is a viewing angle corresponding to a maximum value of viewing angle quality in the space.

In an embodiment, the space includes a plurality of sub-spaces, and the key viewing angle unit includes a candidate viewing angle unit configured to acquire a viewing angle quality corresponding to each sub-space in the space, and regarding the viewing angle corresponding to maximum value of viewing angle quality as the candidate viewing angle of the space; a viewing angle screening unit configured to eliminate a viewing angle in the candidate viewing angles whose corresponding distance is less than a preset value, and obtaining a key viewing angle of the space.

In an embodiment, the path generating module includes a path subset unit configured to classify the aerial photographing paths in the aerial photographing path set according to the divided space, and obtain the aerial photographing path set in the UAV aerial photographing safe space; a local path cost unit configured to acquire a local path cost of each aerial photographing path in the aerial photographing path subset, and obtain a candidate aerial photographing path corresponding to the aerial photographing path subset based on a local path cost minimum principle; a local path unit configured to generate an aerial photographing path set according to the candidate aerial photographing path corresponding to each aerial photographing path subset.

In an embodiment, the local path cost unit includes a local path parameter acquiring module configured to acquiring an average viewing angle quality of the aerial photographing path in the set of aerial photographing path subsets, an angle between an aerial photographing path and the aerial photographing landmark dominant axis, and a change rate of the aerial photographing path viewing angle; a local path cost calculating unit configured to obtain a local path cost corresponding to an aerial photographing path according to the average viewing angle quality of the aerial photographing path, the angle between the aerial photographing path and the aerial photographing landmark dominant axis, and a change rate of the aerial photographing path viewing angle.

In an embodiment, the viewing angle quality constructing module includes a rendering image acquiring module configured to acquire a rendering image of the aerial photographing landmark; a weight map constructing unit configured to construct a weight map corresponding to an image pixel of the aerial photographing landmark; and a viewing angle quality generating unit configured to obtaining a viewing angle quality scalar field of the aerial photographing landmark according to the rendering image and the weight map.

In an embodiment, the rendering image acquiring module includes a salience calculation unit configured to calculate a top surface salience and a side surface salience of the aerial photographing landmark respectively; a rendering unit configured to obtain the rendering image of the aerial photographing landmark according to the top surface salience and the side surface salience.

In an embodiment, the safe space module includes an information acquiring module configured to acquire an image corresponding to the aerial photographing landmark and two-dimensional silhouettes of the aerial photographing landmark; a distance calculation unit configured to calculate a distance between each pixel in the image and the two-dimensional silhouettes; and a prohibited space unit configured to acquire a pixel corresponding to a preset safe distance in the distance, obtaining an equidistant line corresponding to the preset safe distance from the pixel, and using the equidistant line as the two-dimensional silhouettes of the aerial photographing prohibited space; and obtaining a UAV aerial photographing safe space according to two-dimensional silhouettes of the aerial photo prohibited space.

In an embodiment, when the inputted aerial photographing landmark is a plurality of aerial photographing landmarks, the path generating module further includes a migration path cost module configured to acquire a path cost corresponding to a migration path; a global path generating module configured to generate a UAV global aerial photographing path according to the aerial photographing path set and a path cost corresponding to the migration path.

In an embodiment, the migration path cost module includes a migration path acquiring module configured to acquire a migration path; a migration path parameter acquiring module configured to acquire an average viewing angle quality of the migration path, a change rate of the migration path viewing angle, and a steering angle of the migration path; a migration path cost calculating unit configured to obtain a path cost corresponding to the migration path according to the average viewing angle quality of the migration path, the change rate of the migration path viewing angle, and the steering angle of the migration path.

In an embodiment, the global path generating module includes a local path cost calculating unit configured to calculate a local path cost of each photographing path in the aerial photographing path set; a global path solving unit configured to construct and solve a generalized travel salesman problem according to a path cost corresponding to the migration path and a local path cost, so as to obtain a UAV global aerial photographing path.

For specific definition of the apparatus for generating an aerial photographing path for a UAV, reference may be made to the definition of the above method for generating an aerial photographing path for a UAV, and details are omitted for brevity. Each of the modules in the apparatus for generating an aerial photographing path for a UAV described may be entirely or partially implemented by software, hardware, or a combination thereof. Each of the modules may be embedded in or independent of the processor in the computer device in the form of hardware, or may be stored in the memory in the computer device in the form of software, so that the processor calls and executes the operations corresponding to each of the modules.

Figure 17:
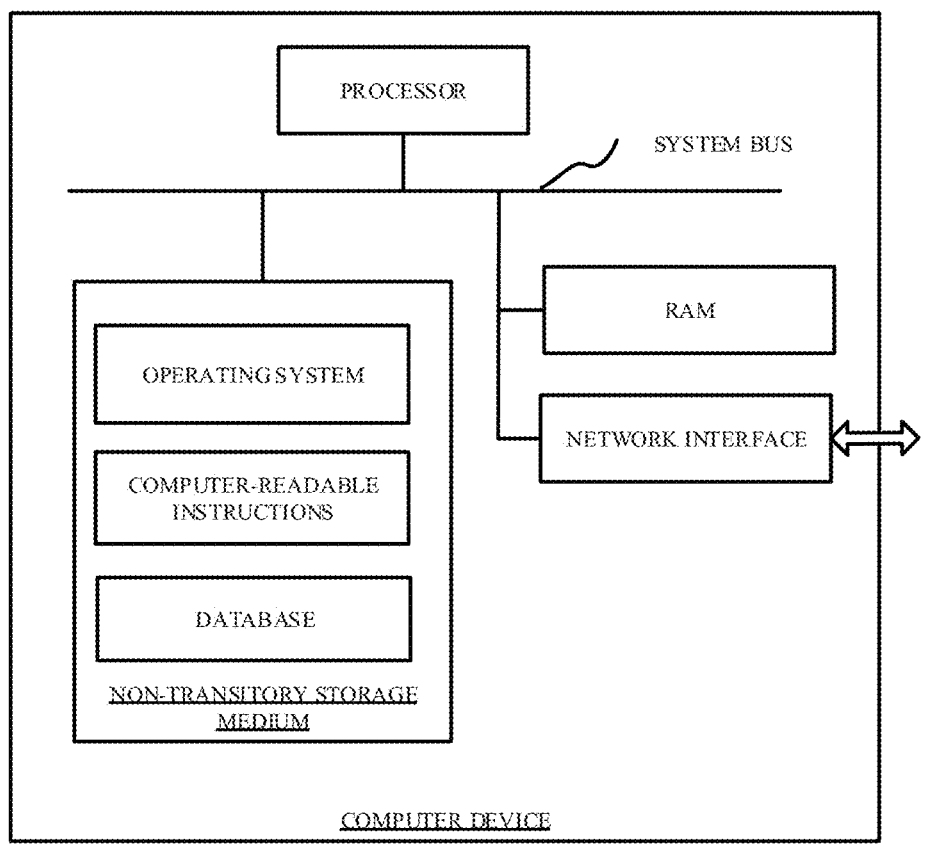
FIG. 17 is a schematic diagram of an internal structure of a computer device according to an embodiment.

In an embodiment, a computer device is provided, which may be a server and an internal structure thereof may be as shown in FIG. 17. The computer device includes a processor, a memory, a network interface, and a database connected through a system bus. The processor of the computer device is configured to provide calculation and control capabilities. The memory of the computer device includes a non-transitory storage medium and a random access memory (RAM). The non-transitory storage medium stores an operating system, computer-readable instructions and the database. The RAM provides an environment for the operation of the operating system and the computer-readable instructions in the non-transitory storage medium. The database of the computer device is configured to store data such as the to-be-translated analysis result set. The network interface of the computer device is configured to communicate with an external terminal through a network connection. The computer-readable instructions are executed by the processor to implement the method for generating an aerial photographing path for a UAV.

Those skilled in the art will appreciate that the structure shown in FIG. 17 is merely a block diagram of a portion of the structure associated with the solution of the present disclosure, and does not constitute a limitation on the computer device to which the solution of the present disclosure is applied, a particular computer device may include more or less components, or combine certain components, or with a different arrangement of components.

In an embodiment, a computer device is provided, which includes a memory and a processor, the memory stores computer-readable instructions that, when executed by the processor, cause the processor to perform the steps of the method for generating an aerial photographing path for a UAV according to any one of the embodiments of the present application.

In an embodiment, also provides one or more non-volatile storage medium storing computer-readable instructions that, when executed by one or more processors, cause the processor to perform the steps of the method for generating an aerial photographing path for a UAV according to any one of the embodiments of the present application.

It should be appreciated that the steps of the embodiments of the present application are not necessarily performed sequentially in the order indicated by the arrows. The performance of these steps is not key to the order in which they are performed unless explicitly stated herein, and the steps may be performed in other orders. Moreover, at least a part of the steps of the embodiments may include a plurality of sub-steps or stages, which are not necessarily performed at the same time, but may be performed at different times, and the order in which the sub-steps or stages are performed is not necessarily performed sequentially, but may be performed in turns or alternatively with other steps or at least a part of sub-steps or stages of other steps.

Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method for generating an aerial photographing path for a UAV, the method comprising:
    acquiring an inputted aerial photographing landmark;
    obtaining a UAV aerial photographing safe space according to the aerial photographing landmark;
    constructing a viewing angle quality scalar field of the aerial photographing landmark; and
    generating an aerial photographing path set in the UAV aerial photographing safe space according to the viewing angle quality scalar field;
    wherein the generating the aerial photographing path set in the UAV aerial photographing safe space according to the viewing angle quality scalar field comprises:
    dividing the viewing angle quality scalar field into a plurality of spaces based on a cylindrical coordinate system; and
    acquiring a key viewing angle of each respective space in the plurality of spaces, and performing curve fitting in the UAV aerial photographing safe space on the basis of the key viewing angle to generate the aerial photographing path set, wherein the key viewing angle is a viewing angle corresponding to a maximum value of viewing angle quality in the respective space.

2. The method according to claim 1, wherein the respective space comprises a plurality of sub-spaces, the acquiring the key viewing angle of each respective space in the plurality of spaces comprises:
    acquiring a viewing angle quality corresponding to each sub-space in the respective space, and regarding a viewing angle corresponding to a maximum viewing angle quality as a candidate viewing angle of the respective space; and
    removing a viewing angle in the candidate viewing angle whose corresponding distance is less than a preset value, and obtaining a key viewing angle of the respective space.

3. The method according to claim 1, wherein the generating the aerial photographing path set in the UAV aerial photographing safe space according to the viewing angle quality scalar field further comprises:
    classifying aerial photographing paths in the aerial photographing path set according to a divided space, and obtaining an aerial photographing path subset in the UAV aerial photographing safe space;
    acquiring a local path cost of each aerial photographing path in the aerial photographing path subset, and obtaining a candidate aerial photographing path corresponding to the aerial photographing path subset based on a local path cost minimum principle; and
    generating a cost-based aerial photographing path set according to the candidate aerial photographing path corresponding to the aerial photographing path set.

4. The method according to claim 3, wherein the acquiring the local path cost of each aerial photographing path in the aerial photographing path subset comprises:
    acquiring an average viewing angle quality of the aerial photographing path, an angle between the aerial photographing path and an aerial photographing landmark dominant axis, and a change rate of the viewing angle of the aerial photographing path; and
    obtaining the local path cost corresponding to the aerial photographing path according to the average viewing angle quality of the aerial photographing path, the angle between the aerial photographing path and the aerial photographing landmark dominant axis, and the change rate of the viewing angle of the aerial photographing path.

5. The method according to claim 1, wherein the constructing the viewing angle quality scalar field of the aerial photographing landmark comprises:
acquiring a rendering image of the aerial photographing landmark;
constructing a weight map corresponding to an image pixel of the aerial photographing landmark; and
obtaining the viewing angle quality scalar field of the aerial photographing landmark according to the rendering image and the weight map.

6. The method according to claim 5, wherein the acquiring the rendering image of the aerial photographing landmark comprises:
calculating a top surface salience and a side surface salience of the aerial photographing landmark respectively; and
obtaining the rendering image of the aerial photographing landmark according to the top surface salience and the side surface salience.

7. The method according to claim 1, wherein the obtaining the UAV aerial photographing safe space according to the aerial photographing landmark comprises:
acquiring an image corresponding to the aerial photographing landmark and two-dimensional silhouettes of the aerial photographing landmark, the image comprising a plurality of image pixels;
calculating a distance between each pixel in the image and the two-dimensional silhouettes; and
acquiring a safe pixel in the image pixels, the safe pixel corresponding to a preset safe distance from the two-dimensional silhouettes, obtaining an equidistant line comprising the safe pixel and spaced from the two-dimensional silhouettes by the preset safe distance, and using the equidistant line as the two-dimensional silhouettes of an aerial photographing prohibited space; and obtaining a UAV aerial photographing safe space by using the equidistant line as the two-dimensional silhouettes of the aerial photographing prohibited space.

8. The method according to claim 1, wherein when the inputted aerial photographing landmark is a plurality of aerial photographing landmarks, the generating the aerial photographing path set in the UAV aerial photographing safe space according to the viewing angle quality scalar field further comprises:
acquiring a path cost corresponding to a migration path; and
generating a UAV global aerial photographing path according to the aerial photographing path set and the path cost corresponding to the migration path.

9. The method according to claim 8, wherein the acquiring the path cost corresponding to the migration path comprises:
acquiring the migration path;
acquiring an average viewing angle quality of the migration path, a change rate of the migration path viewing angle, and a steering angle of the migration path; and
obtaining the path cost corresponding to the migration path according to the average viewing angle quality of the migration path, the change rate of the migration path viewing angle, and the steering angle of the migration path.

10. The method according to claim 8, wherein the generating the UAV global photographing path according to the aerial photographing path set and the path cost corresponding to the migration path comprises:
calculating a local path cost of each photographing path in the aerial photographing path set; and
constructing and solving a generalized travel salesman problem according to the path cost corresponding to the migration path and the local path cost, and obtaining the UAV global aerial photographing path.

11. A computer device, comprising a memory and a processor, the memory storing computer-readable instructions, the computer device configured so that, when the computer-readable instructions are executed by the processor, the computer-readable instructions cause the processor to perform the steps of:
acquiring an inputted aerial photographing landmark;
obtaining a UAV aerial photographing safe space according to the aerial photographing landmark;
constructing a viewing angle quality scalar field of the aerial photographing landmark; and
generating an aerial photographing path set in the UAV aerial photographing safe space according to the viewing angle quality scalar field;
wherein the device is configured so that, when the computer-readable instructions are executed by the processor, the computer-readable instructions further cause the processor to perform the steps of:
dividing the viewing angle quality scalar field into a plurality of spaces based on a cylindrical coordinate system; and
acquiring a key viewing angle of each respective space in the plurality of spaces, and performing curve fitting in the UAV aerial photographing safe space on the basis of the key viewing angle to generate the aerial photographing path set, wherein the key viewing angle is a viewing angle corresponding to a maximum value of viewing angle quality in the respective space.

12. The computer device according to claim 11, wherein the device is configured so that, when the computer-readable instructions are executed by the processor, the computer-readable instructions further cause the processor to perform the steps of:
acquiring a viewing angle quality corresponding to each sub-space in the respective space, and regarding a viewing angle corresponding to a maximum viewing angle quality as a candidate viewing angle of the respective space; and
removing a viewing angle in the candidate viewing angle whose corresponding distance is less than a preset value, and obtaining a key viewing angle of the respective space.

13. The computer device according to claim 11, wherein the device is configured so that, when the computer-readable instructions are executed by the processor, the computer-readable instructions further cause the processor to perform the steps of:
classifying aerial photographing paths in the aerial photographing path set according to a divided space, and obtaining an aerial photographing path subset in the UAV aerial photographing safe space;
acquiring a local path cost of each aerial photographing path in the aerial photographing path subset, and obtaining a candidate aerial photographing path corresponding to the aerial photographing path subset based on a local path cost minimum principle; and
generating a cost-based aerial photographing path set according to the candidate aerial photographing path corresponding to the aerial photographing path set.

14. One or more non-volatile storage mediums storing computer-readable instructions, the instructions configured so that, when executed by one or more processors, the computer-readable instructions cause the one or more processors to perform the steps of:

acquiring an inputted aerial photographing landmark;

obtaining a UAV aerial photographing safe space according to the aerial photographing landmark;

constructing a viewing angle quality scalar field of the aerial photographing landmark; and generating an aerial photographing path set in the UAV aerial photographing safe space according to the viewing angle quality scalar field;

wherein the computer-readable instructions are configured so that, when the computer-readable instructions are executed by one or more processors, the computer-readable instructions cause the one or more processors to perform the steps of:

dividing the viewing angle quality scalar field into a plurality of spaces based on a cylindrical coordinate system; and acquiring a key viewing angle of each respective space in the plurality of spaces, and performing curve fitting in the UAV aerial photographing safe space on the basis of the key viewing angle to generate the aerial photographing path set, wherein the key viewing angle is a viewing angle corresponding to a maximum value of viewing angle quality in the respective space.

15. The storage medium according to claim 14, wherein the computer-readable instructions are configured so that, when the computer-readable instructions are executed by the one or more processors, the computer-readable instructions cause the one or more processors to perform the steps of:

acquiring a viewing angle quality corresponding to each sub-space in the respective space, and regarding a viewing angle corresponding to a maximum viewing angle quality as a candidate viewing angle of the respective space; and removing a viewing angle in the candidate viewing angle whose corresponding distance is less than a preset value, and obtaining a key viewing angle of the respective space.

16. The storage medium according to claim 14, wherein the computer-readable instructions are configured so that, when the computer-readable instructions are executed by the one or more processors, the computer-readable instructions cause the one or more processors to perform the steps of:

classifying aerial photographing paths in the aerial photographing path set according to a divided space, and obtaining an aerial photographing path subset in the UAV aerial photographing safe space;

acquiring a local path cost of each aerial photographing path in the aerial photographing path subset, and obtaining a candidate aerial photographing path corresponding to the aerial photographing path subset based on a local path cost minimum principle; and generating a cost-based aerial photographing path set according to the candidate aerial photographing path corresponding to the aerial photographing path set.

17. The storage medium according to claim 16, wherein the computer-readable instructions are configured so that, when the computer-readable instructions are executed by the one or more processors, the computer-readable instructions cause the one or more processors to perform the steps of:

acquiring an average viewing angle quality of the aerial photographing path, an angle between the aerial photographing path and an aerial photographing landmark dominant axis, and a change rate of the viewing angle of the aerial photographing path; and obtaining the local path cost corresponding to the aerial photographing path according to the average viewing angle quality of the aerial photographing path, the angle between the aerial photographing path and the aerial photographing landmark dominant axis, and the change rate of the viewing angle of the aerial photographing path.

\* \* \* \* \*